UNITED STATES PATENT OFFICE 2,069,663

VAT DYESTUFFS OF THE ANTHRAQUINONE SERIES AND A PROCESS OF PREPARING THEM

Arthur Wolfram, Frankfort-on-the-Main, Paul Nawiasky, Ludwigshafen-on-the-Rhine, Gerhard Langbein, Hofheim on Taunus, and Werner Elbs, Frankfort-on-the-Main, Germany, assignors to General Aniline Works, Inc., New York, N. Y., a corporation of Delaware No Drawing. Application March 23, 1933, Serial No. 662,392. In Germany March 26, 1932

8 Claims. (Cl. 260—36)

The present invention relates to vat dyestuffs of the anthraquinone series and to a process of preparing them, more particularly it relates to compounds of the following formulae:

(I)

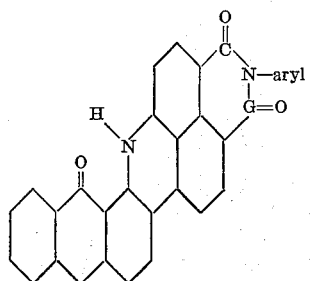

(II)

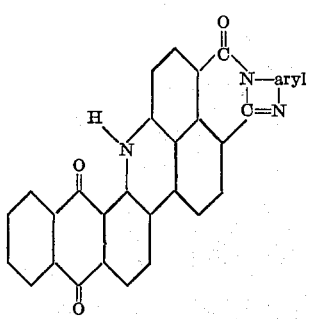

(III)

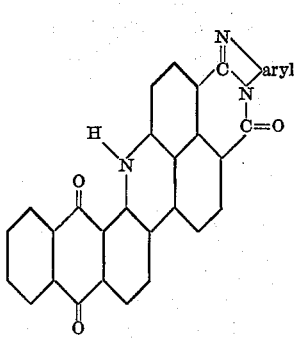

We have found that valuable vat dyestuffs of the anthraquinone series are obtainable by causing a caustic alkali melt to act at an elevated temperature, such as about 230 to 270° C., upon a compound of the group consisting of 4-anthraquinonylaminonaphthalene-1.8-dicarboxylic acid imides and 4-anthraquinonylamino-1.8-naphthoylenearylimidazoles, aryl meaning an aryl group of the benzene series. The vat dyestuffs obtainable from the said naphthalimides probably correspond to the Formula I above given in which aryl may be substituted by any other radical.

The vat dyestuffs obtainable from the said naphthoylene-arylimidazoles probably correspond to the Formulas II and III above given. In many cases the dyestuffs are obtained as mixtures of isomeric compounds which may be separated into their components.

According to the present process a great number of new products are obtainable, for instance, those of the following general formula:

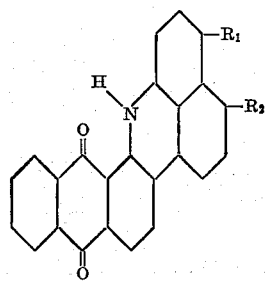

wherein $R_1$ and $R_2$ jointly represent a bivalent radical of the group consisting of

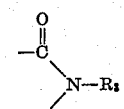

and

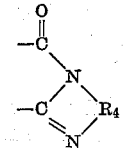

wherein $R_3$ represents an alkyl or an aryl group of the benzene series and R4 represents an aryl group of the benzene series, which is bound in two adjacent positions to the nitrogen atoms.

The following examples serve to illustrate the invention but they are not intended to limit it thereto, the parts being by weight:

(1) 27.7 parts of 4-bromnaphthalic acid anhydride are condensed in the usual manner in 300 parts of nitrobenzene with 23 parts of α-aminoanthraquinone. The body thus obtained crystallizes from chlornaphthalene in the form of red-brown crystals and melts at about 400° C. It dissolves in concentrated sulfuric acid to an olive-green solution. 10 parts of the reaction product are heated with 20 parts of orthophenylenediamine to 230° C., whereby the melt solidifies with elimination of the new product which, likewise, forms red-brown crystals and melts at about 373° C. In concentrated sulfuric acid the substance dissolves to a red solution. The condensation product thus obtainable is melted in 10 times its weight of caustic potash. At 230° C. to 240° C. the reaction product separates from the melt. The dyestuff is first obtained in the form of the leuco compound and is best oxidized by means of air. After purification and recrystallization from organic solvents a green dyestuff is obtained which dyes cotton from a red-violet vat after exposure to air, a beautiful green shade.

(2) The condensation product from 4-bromo-1.8-naphthalene-dicarboxylic acid anhydride and α-aminoanthraquinone is boiled with 5 times its weight of aniline. There is obtained a red-brown condensation product which dissolves in sulfuric acid to a red solution. The product thus obtainable is melted with 10 times its weight of caustic potash and a trace of alcohol. At 230° C. the dyestuff separates from the melt. It is worked up as described in Example 1. It dyes cotton from a red vat bluish-green tints.

(3) 14 parts of 4-bromo-naphthalic acid anhydride are boiled with 5.4 parts of ortho-phenylenediamine for 4 hours in glacial acetic acid. During the boiling, bromo-1'-8'-naphthoylene-benzimidazole separates in the form of small yellow flakes. It melts at about 241° C.–243° C. and dissolves in sulfuric acid to a yellow solution. The yield amounts to about 90% of that of the theory. 10.5 parts of the benzimidazole of naphthalic acid thus obtained are condensed in the usual manner with 7 parts of α-aminoanthraquinone in nitrobenzene and there is obtained with a very good yield a condensation product melting at 367° C.–368° C. and dissolving in sulfuric acid to a red solution. 1 part of the condensation product thus obtainable is melted with 10 parts of caustic potash. The formation of the dyestuff takes place at 230° C. to 240° C. The product is worked up as described in Example 1. The same green dyestuff is obtained.

(4) By crystallization from chlorobenzene, the intermediate product obtainable according to Example 3, i. e. bromo-1'8'-naphthoylene-benzimidazole, may be separated into two isomeric components, one of which melts at 223° C. and is rather easily soluble in chlorobenzene and the other is more difficultly soluble in chlorobenzene and melts at 283° C.

(a) The compound melting at 223° C. is condensed as indicated in Example 3 with alpha-aminoanthraquinone. There is obtained a red-brown crystalline compound melting at about 380° C. and dissolving in concentrated sulfuric acid to a red solution. The condensation product thus obtainable is introduced by 100° C. into a melt of 10 parts of caustic potash and 1 part of alcohol, the temperature is raised to 250° C. and the whole is kept molten for 50 minutes at 250° C. to 260° C. A green dyestuff is obtained yielding a red-violet vat. From nitrobenzene the dyestuff crystallizes in the form of needles melting at 342° C. to 343° C.

(b) From bromnaphthoylenebenzimidazole melting at 283° C. there is obtained, in the manner indicated in Example 3, by means of alpha-aminoanthraquinone a red-brown crystalline product which melts at about 400° C. and dissolves in concentrated sulfuric acid to a red solution. By melting the compound thus obtainable as indicated under 4 (a), a yellowish-green dyestuff is obtained which yields a violet vat and crystallizes from nitrobenzene in the form of needles melting at 363° C.

Probably the dyestuff melting at 342° C.–343° C. as described in Example 4 (a) has the constitution of Formula IV and the dyestuff melting at 363° C. as described in Example 4 (b) is supposed to correspond with the constitution of Formula V.

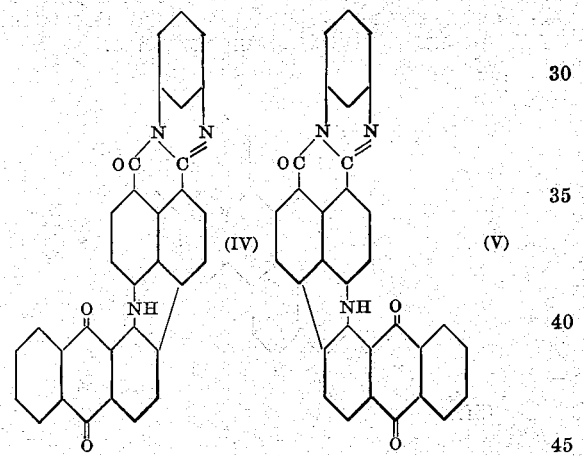

(5) 14 parts of 4-bromo-naphthalic acid anhydride are heated to boiling for 1 hour with 7.5 parts of para-chloro-ortho-phenylenediamine in 100 parts of glacial acetic acid, the whole is filtered with suction while hot, the solid matter is washed with alcohol and, if desired, extracted by boiling with dilute caustic soda solution. 4'-bromo-1'-8'-naphthoylene-chloro-4-benzimidazole forms a yellow crystalline product melting at 230° C.

38.4 parts of benzimidazole, 22.3 parts of alpha-aminoanthraquinone, 10 parts of potassium acetate, 2 parts of cuprous iodide and 400 parts of nitrobenzene are heated to boiling for 5 hours. The whole is filtered with suction at 100° C., the solid matter is washed with nitrobenzene, alcohol and water and dried. The condensation product which crystallizes in brown needles is obtained with a good yield.

10 parts of the condensation product thus obtainable are introduced at 100° C. into a mixture of 150 parts of caustic potash and 15 parts of alcohol and the temperature is slowly raised to 250° C.–260° C. After 15 minutes, the melt is mixed with water, air is blown in, the whole is filtered with suction and the solid matter is washed until neutral and dried. The dark green product of fusion dyes cotton from a red-violet vat dull green tints.

(6) 14 parts of 4-bromo-naphthalic acid anhydride, 9 parts of the hydrochloride of ortho-ortho'-diamino-benzidine, 10 parts of sodium acetate and 200 parts of glacial acetic acid are heated to boiling for 1 hour. The whole is filtered with suction, while hot, and the solid matter is washed with alcohol. The di-(4'-bromo-1'-8'-naphthoylene-benzimidazole) forms a red-brown powder melting above 360° C.

7 parts of said di-benzimidazole, 4.5 parts of alpha-amino-anthraquinone, 2 parts of potassium acetate and 0.4 part of cuprous iodide are heated to boiling for 5 hours in 100 parts of nitrobenzene. At 150° C. the whole is filtered with suction and the solid matter is washed with nitrobenzene, alcohol and water. The dark brown condensation product is obtained with a good yield.

10 parts of the condensation product thus obtainable are introduced at 100° C. into a mixture of 150 parts of caustic potash and 15 parts of alcohol. The whole is then slowly heated to 260° C. to 270° C. and this temperature is maintained for 1 hour. The product is worked up as described in Example 5. The dyestuff obtained dyes cotton from a red-violet vat yellowish-green tints.

(7) By using in Example 2 instead of aniline, monomethylamine and by working under the same conditions with an alcoholic caustic potash melt, there is obtained a dyestuff which dyes from a violet vat intense grey-olive tints.

We claim:

1. The process which comprises causing a caustic alkali melt to act at a temperature of about 230° C. to about 270° C. upon a 4 anthraquinonyl-amino-1,8-naphthoylenearylimidazole, aryl meaning an aryl group of the benzene series.

2. The process which comprises causing a caustic potash melt to act at a temperature of about 230° C. to about 240° C. upon a mixture of isomeric compounds of the following formulae:

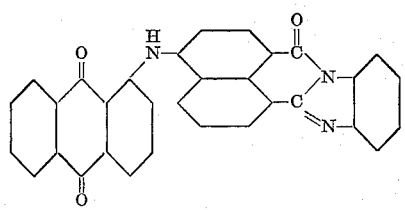

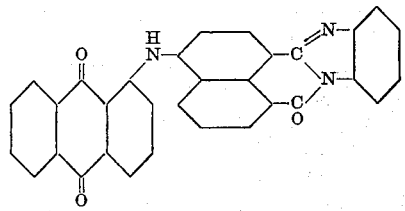

3. The process which comprises causing a caustic potash melt to act, in the presence of alcohol, at a temperature of about 250° C. to 260° C. upon a compound of the following formula:

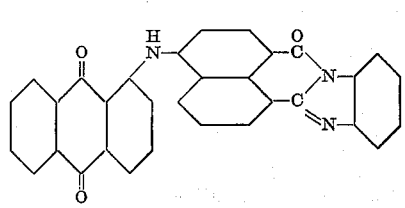

4. The process which comprises causing a caustic potash melt to act, in the presence of alcohol, at a temperature of about 250° C. to about 260° C. upon a compound of the following formula:

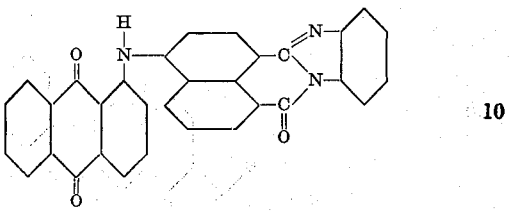

5. The products of the following formula:

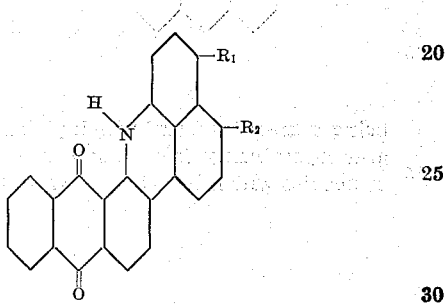

wherein $R_1$ and $R_2$ jointly represent a bivalent radical of the formula

wherein $R_3$ represents an aryl group of the benzene series, which is bound in two adjacent positions to the nitrogen atoms, said products being vat dyestuffs dyeing the fiber greenish tints.

6. The mixture of the products of the following formulae:

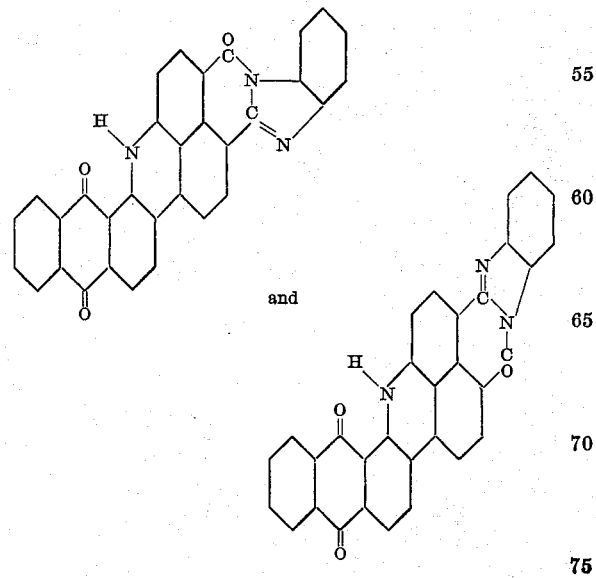

and being a green dyestuff and dyeing cotton from a red-violet vat, after exposure to air, a beautiful green tint.

7. The product of the following formula:

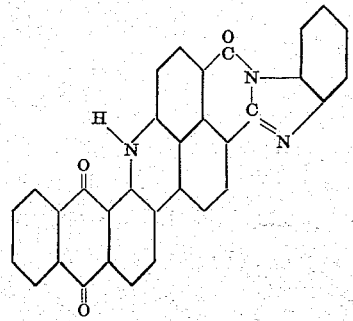

being a green dyestuff which yields red-violet vat and crystallizing from nitrobenzene in the form of needles which melt at 342° C. to 343° C.

8. The product of the following formula:

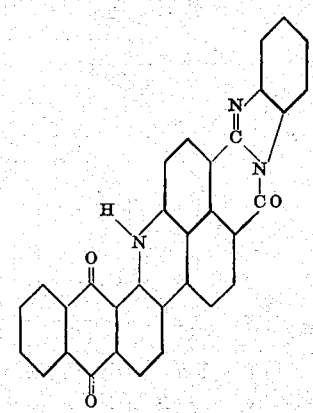

being a yellowish-green dyestuff which yields a violet vat and crystallizing from nitrobenzene in the form of needles melting at 363° C.

ARTHUR WOLFRAM.
PAUL NAWIASKY.
GERHARD LANGBEIN.
WERNER ELBS.